(12) United States Patent
Toyama

(10) Patent No.: US 9,071,042 B2
(45) Date of Patent: Jun. 30, 2015

(54) WIRING HARNESS AND MANUFACTURING METHOD THEREOF

(75) Inventor: Eiichi Toyama, Kosai (JP)

(73) Assignee: Yazaki Corporation, Tokyo (JP)

( * ) Notice: Subject to any disclaimer, the term of this patent is extended or adjusted under 35 U.S.C. 154(b) by 133 days.

(21) Appl. No.: 13/992,369

(22) PCT Filed: Dec. 7, 2011

(86) PCT No.: PCT/JP2011/078839
§ 371 (c)(1),
(2), (4) Date: Jun. 7, 2013

(87) PCT Pub. No.: WO2012/077823
PCT Pub. Date: Jun. 14, 2012

(65) Prior Publication Data
US 2013/0256029 A1   Oct. 3, 2013

(30) Foreign Application Priority Data
Dec. 10, 2010   (JP) .................... 2010-275309

(51) Int. Cl.
*H02G 3/04* (2006.01)
*B60R 16/02* (2006.01)
*H01B 19/04* (2006.01)

(52) U.S. Cl.
CPC .......... *H02G 3/0406* (2013.01); *B60R 16/0207* (2013.01); *B60R 16/0215* (2013.01); *H02G 3/0462* (2013.01); *H01B 19/04* (2013.01)

(58) Field of Classification Search
CPC ............... H02G 3/0462; H02G 3/0406; B60R 16/0207; B60R 16/0215; H01B 19/04

USPC ............ 174/72 A, 72 R, 68.1; 439/207
See application file for complete search history.

(56) References Cited

U.S. PATENT DOCUMENTS

| | | | |
|---|---|---|---|
| 8,592,685 B2 * | 11/2013 | Kamenoue ............... | 174/152 G |
| 2004/0099427 A1 | 5/2004 | Kihira | |
| 2006/0232065 A1 | 10/2006 | Burke et al. | |
| 2006/0272845 A1 | 12/2006 | Galey et al. | |
| 2010/0043225 A1 | 2/2010 | Oga et al. | |

FOREIGN PATENT DOCUMENTS

| | | |
|---|---|---|
| JP | 2004-224156 A | 8/2004 |
| WO | WO-2005/042858 A2 | 5/2005 |
| WO | WO-2005/106305 A1 | 11/2005 |

OTHER PUBLICATIONS

International Search Report dated May 22, 2012 and Written Opinion of the International Searching Authority, issued for PCT/JP2011/078839.

* cited by examiner

*Primary Examiner* — Dhirubhai R Patel
(74) *Attorney, Agent, or Firm* — Locke Lord LLP

(57) ABSTRACT

The present invention provides a wiring harness having a flexible tube body being an exterior component of a conducting path, and a manufacturing method thereof. The wiring harness has a conducting path assembly including a conducting path and a flexible tube body being an exterior component of the conducting path assembly. The tube body has a water or light hardening fixing member. When the water or light hardening fixing member is hardened, a shape holding portion is formed. The wiring harness is held by the shape holding portion of the tube body with a desired shape.

12 Claims, 3 Drawing Sheets

WIRING HARNESS AND MANUFACTURING METHOD THEREOF

FIELD OF THE INVENTION

The present invention relates to a wiring harness having a flexible tube body as an exterior component of a conducting path, and a manufacturing method thereof.

BACKGROUND OF THE INVENTION

A wiring harness disclosed in the Patent Document 1 has three high-voltage electric wires and three metallic protection pipes for receiving and protecting the three high-voltage electric wires one by one. The high-voltage electric wire connects a motor mounted on a front side of a vehicle with an inverter mounted on an intermediate or rear side of the vehicle.

The wiring harness is arranged via a vehicle under floor which is an outside of a vehicle frame. For this reason, the metallic protection pipe is formed so that the high-voltage electric wire can be protected from being splashed with water or stone. The metallic protection pipe has stiffness property for protecting the high-voltage electric wire and preventing deflection of the high-voltage electric wire, and an electromagnetic shield function since it is made of metallic.

The three wiring harness insert the high-voltage electric wire into the metallic protection pipe with a straight state, respectively. Thereafter, the metallic protection pipe is bent along a route of the wiring harness arranged on the vehicle under floor. The wiring harness is manufactured with a factory of harness manufacturer as described above. Thereafter, the wiring harness is conveyed to an assembly factory of vehicle manufacturer, and is assembled in a predefined position of the vehicle. Thereby, arrangement of the wiring harness is completed.

PRIOR ART DOCUMENT

Patent Document

[Patent Document 1] Japanese Patent Publication Application No. 2004-224156

SUMMARY OF THE INVENTION

Technical Problem

In conventional art, when the wiring harness is transported, it is required to keep enough space with each the metallic protection pipe and each the wiring harness so as to avoid contact with the metallic protection pipe each other and deformation thereof. Furthermore, since the metallic protection pipe is three-dimensionally bent, there is a problem such as spatial space is required. In order to solve the above problem, the flexible tube body may used as a replacement part of the metallic protection pipe. However, if the tube body is used as a replacement part of the metallic protection pipe, there are several problems described below. Further, it is difficult to overcome those problems.

More specifically, if the flexible tube body is used, it is difficult to hold a desired form when the wiring harness is assembled and arranged. Furthermore, if the flexible tube body is used, a protector is required so as to assemble the tube body in a predetermined position of the vehicle. The protector is a member made of resin in accordance with the arrangement route of the wiring harness. For this reason, special design/component is required with respect to each vehicle. As a result, the tube body lacks versatility, and cost is increased.

For protector, it is possible to make a prototype die many times in a development phase. As a result, design cost, die cost, design time and the like are increased. Furthermore, since a portion assembled to the tube body is getting bigger, the protector approaches the ground and problems occur.

Accordingly, in order to attain the above object, the present invention to provide a wiring harness which has a flexible tube body and can keep the tube body with a desired shape without using protector, and a manufacturing method thereof.

Solution to Problem

In order to attain the above-described objectives, according to a first aspect of the present invention, the wiring harness of the present invention has a flexible tube body being an exterior component of one or a plurality of conducting paths and a water or light hardening fixing member provided on one or a plurality of a predefined position of the tube body. Further, a shape holding portion of the tube body is formed by hardening the water or light hardening fixing member.

According to the present invention having the above feature, the water or light hardening fixing member is provided on the flexible tube body. Therefore, the tube body can be maintained with a desired shape by hardening the water or light hardening fixing member without using a protector.

According to a second aspect of the present invention, an outer peripheral surface of the tube body is a rough member.

According to the present invention having the above feature, when the water or light hardening fixing member is hardened, the water or light hardening fixing member enters into a depression of the outer peripheral surface of the tube body, and is caught on a projection of the outer peripheral surface of the tube body.

According to a third aspect of the present invention, the outer peripheral surface of the tube body is a watertight member.

According to the present invention having the above feature, when the water hardening fixing member is provided on the tube body and is hardened, fluid such as water does not arrive in the conducting path arranged in the inside of the tube body. Furthermore, for example, when the wiring harness is arranged in a vehicle under floor, splash of water does not reach the conducting path of the inside of the tube body.

According to a fourth aspect of the present invention, the water or light hardening fixing member is a winding type member.

According to the present invention having the above feature, it is possible to arrange the water or light hardening fixing member on the tube body by simply winding the water or light hardening fixing member on the outer peripheral surface of the tube body.

Additionally, in order to attain the above-described objectives, according to a fifth aspect of the present invention, a manufacturing method of a wiring harness having a flexible tube body which is an exterior component of one or a plurality of conducting paths has the steps of a first step that providing a water or light hardening fixing member on one or a plurality of predefined portions of the tube body, and a second step that hardening the water or light hardening fixing member so as to form at least the predefined portions with a desired shape.

According to the present invention having the above feature, the wiring harness having the tube which is maintained with a desired shape by hardening the water or light hardening fixing member and the conducting path inserted into the tube body is manufactured with two steps.

According to a sixth aspect of the present invention, in the manufacturing method of the wiring harness described above, a winding type member is used as the water or light hardening fixing member. Further, a member which is previously formed with a desired thickness or a member which is able to be formed with a desired thickness by winding is used.

According to the present invention having the above feature, the thickness of the water or light hardening fixing member can be controlled so as to increase the strength of the shape holding portion.

According to a seven aspect of the present invention, in the manufacturing method of the wiring harness described above, the second step is performed when the wiring harness is arranged after carrying the wiring harness.

According to the present invention having the above feature, for example, when the wiring harness is carried to an assembly factory of vehicle manufacturer, the wiring harness can be manufactured with a preferred shape. Furthermore, the wiring harness can be manufactured with a suitable shape when the wiring harness is assembled on a predetermined position of the vehicle.

Effects of the Invention

According to the first aspect of the present invention, the flexible tube body as the exterior component of the conducing path can be maintained with a desired shape. Further, according to the present invention, a protector is not required, and the versatility of the tube body is increased. As a result, cost can be reduced. In addition, according to the present invention, since the flexible tube body as the exterior component of the conducting path is provided, it is not necessary to keep large space when carrying the wiring harness. Therefore, space can be saved and cost can be reduced when carrying it.

According to the second aspect of the present invention, when the water or light hardening fixing member is hardened, the water or light hardening fixing member can enter into the depression of the outer peripheral surface of the tube body, and can be caught on the projection of the outer peripheral surface of the tube body. Therefore, the shape and arrangement of the shape holding portion can be stabilized.

According to the third aspect of the present invention, the conducting path of the inside of the tube body can be protected from fluid such as water.

According to the fourth aspect of the present invention, the water or light hardening fixing member can be easily provided on the outer peripheral surface of the tube body.

According to the fifth aspect of the present invention, a better manufacturing method of the wiring harness can be provided.

According to the sixth aspect of the present invention, the wiring harness in which the strength of the shape holding portion is increased can be manufactured.

According to the seventh aspect of the present invention, the manufacturing method considering carrying and assembly of the wiring harness can be provided.

BRIEF DESCRIPTION OF THE DRAWINGS

FIG. 2A is a view winding the water or light hardening fixing member on the tube body with a tape rewinding method;

FIG. 2B is a view winding the water or light hardening fixing member on the tube body with a sheet shape;

FIG. 2C is a view winding the water or light hardening fixing member on the tube body together with a clamp;

FIG. 3A is an explanatory diagram of a step arranging the water or light hardening fixing member in the tube body;

FIG. 3B is an explanatory diagram of a transporting step

FIG. 3C is an explanatory diagram of a forming step of the shape holding portion; and FIG. 3D is an explanatory diagram of an assembling step.

DESCRIPTION OF THE PREFERRED EMBODIMENT

A wiring harness has a conducting path and a flexible tube body being an exterior component of the conducting path. In the tube body, a water or light hardening fixing member is provided. When the water or light hardening fixing member is hardened, a shape holding portion is formed. The wiring harness is held with a desired shape by the shape holding portion of the tube body.

Embodiment

Figure 1A:
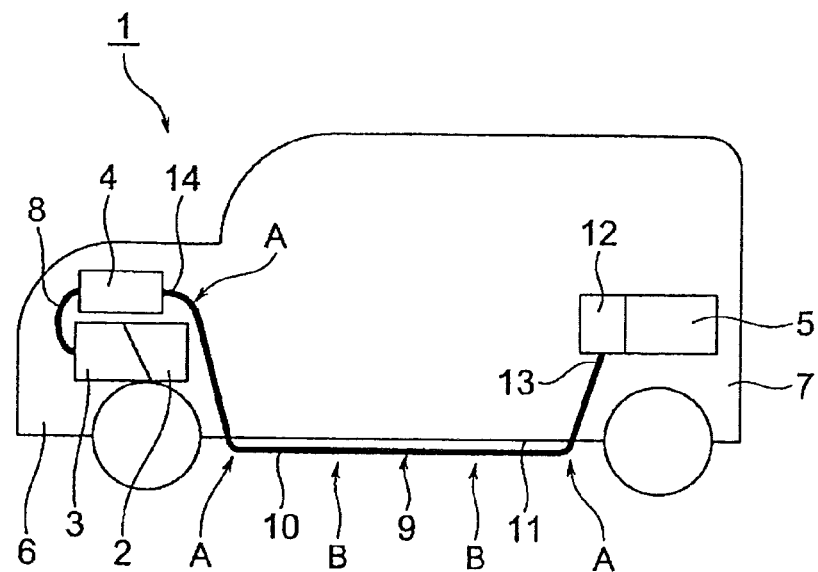
FIG. 1A is a schematic diagram showing a configuration state of a wiring harness according to the wiring harness of the present invention.
Figure 1B:
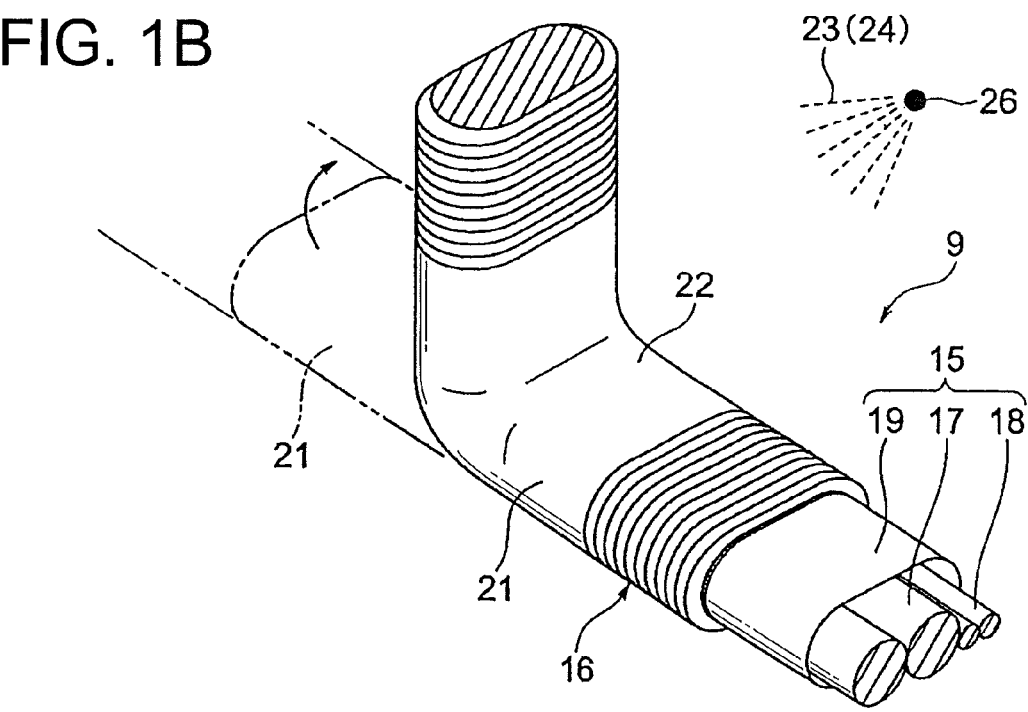
FIG. 1B is a perspective view showing a construction of the wiring harness and a shape holding portion.
Figure 2A:
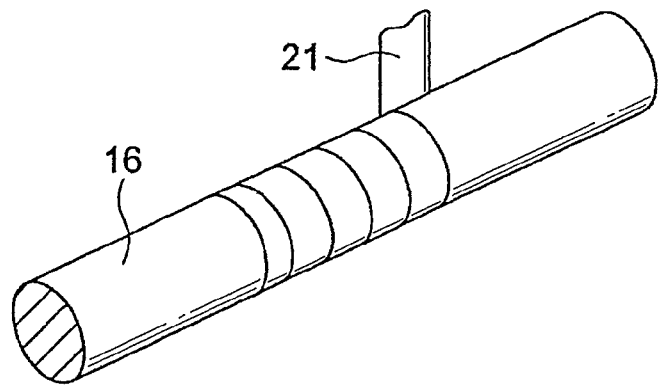
FIG. 2A to 2C are views arranging a water or light hardening fixing member on a tube body.
Figure 2B:
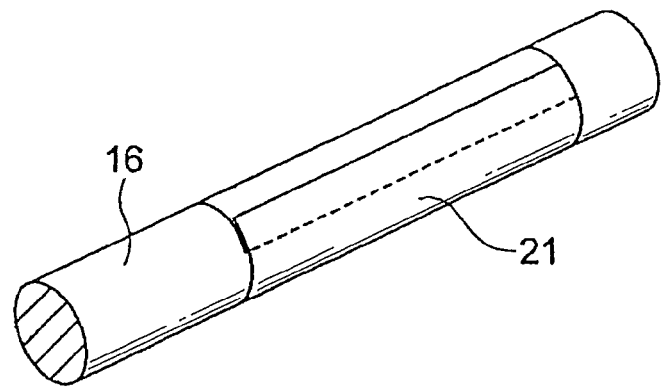
Figure 2C:
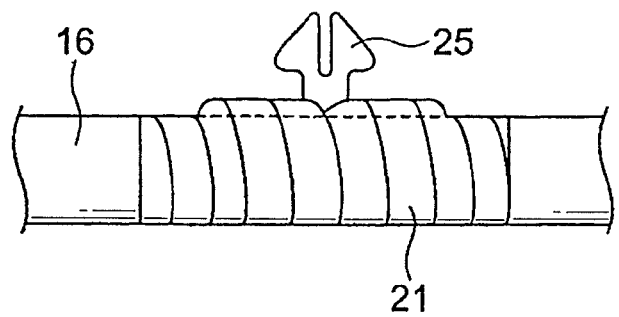

Hereafter, an embodiment of the present invention will be explained with reference to the drawings. FIGS. 1A and 1B are diagrams of the wiring harness of the present invention. FIGS. 2A to 2C are diagrams arranging the water or light hardening fixing member in the tube body. FIGS. 3A to 3D are diagrams of a manufacturing method of the wiring harness. In the embodiment of the present invention, one example applying the wiring harness of the present invention to a hybrid vehicle or electric vehicle will be explained.

The reference numeral 1 in FIG. 1 shows a hybrid vehicle. The hybrid vehicle 1 is driven by mixing two powers of an engine 2 and a motor unit 3. An electric power from a battery 5 (battery pack) is supplied to the motor unite 3 through an inverter unit 4. The engine 2, the motor unit 3, and the inverter unit 4 are mounted on an engine room 6 located at a position which a front wheel is arranged. The battery 5 is mounted on vehicle rear portion 7 which a rear wheel is arranged. (The battery may be mounted in a vehicle room which is arranged on the back of the engine room 6).

The motor unit 3 and the inverter unit 4 are connected to a common high-voltage wiring harness 8. The battery 5 and the inverter unit 4 are connected to a wiring harness 9 of the present invention. The wiring harness 9 is constructed for used in high-voltage, and arranged in a ground side of a vehicle under floor 11. The vehicle under floor 11 is a well-known body and a panel member. A through hole penetrates through the vehicle under floor 11 at a predetermined position.

The wring harness 9 and the battery 5 are connected through a junction block 12 arranged in the battery 5. A rear end 13 of the wiring harness 9 is connected to the junction block 12. The rear end 13 of the wiring harness 9 is arranged on a floor which is an interior room of the vehicle. On the floor, a front end 14 of the wiring harness 9 is arranged. The front end 14 of the wiring harness 9 is connected to the inverter unit 4.

Supplement explanation in the embodiment of the present invention will be described. The motor unit 3 includes a motor and a generator. Further, the inverter unit 4 includes an inverter and a converter. The motor unit 3 is formed as a motor assembly including a shield case. Also, the inverter unit 4 is formed as a inverter assembly including the shield case. The battery 5 is Ni-MH battery types or Li-ion types, and is modularized. Furthermore, an electric storage device such as a capacitor can be used. The battery 5 is not limited when it is available for the hybrid vehicle 1 or the electric vehicle.

The wiring harness 9 is arranged along a middle portion 10 of the vehicle under floor 11 and parallel to the vehicle under floor 11. That is, the wiring harness 9 is arranged so that the middle portion 10 maintains a distance from the ground. The wiring harness 9 is manufactured with a structure of low height so as to maintain the distance from the ground (The structure is described below).

The wiring harness 9 has a conducting path assembly 15, and a tube body 16 being exterior components of the conducting path assembly 15.

The conducting path assembly 15 has two high-voltage electric wires 17, two low-voltage electric wires 18, and an electromagnetic shield member 19 for shielding two high-voltage electric wires 17 and two low-voltage electric wires 18 in one lump. The high-voltage electric wire 17 is a conducting path including a conductor and an insulator (covering), and is formed with a height required for electrically connecting. The conductor is made of copper, copper alloy, aluminum or aluminum alloy. Further, conductors of various structures, such as a conductor made by stranding element wire or formed in a rectangular or bar shape (for example, rectangular single core or round single core. In this case, the electric wire is formed in a bar shape), may be used. The high-voltage electric wire 17 has an unshielded electric wire. A connector 20 (see FIG. 3) is arranged in a terminal of the high-voltage electric wire 17. A connector of the low-voltage electric wire 18 is not shown.

In this embodiment, the high-voltage electric wire 17 is used, but it is not limited thereto. That is, it is possible to use an object arranging an insulator in common bus bar.

The low-voltage electric wire 18 is well-known, and is included in the conducting path assembly 15, but it is not limited. That is, the low-voltage electric wire 18 is optional.

The electromagnetic shield member 19 is a member for electromagnetic shield (namely, a member for guarding against the electromagnetic) so as to cover two high-voltage electric wires 17. The electromagnetic shield member 19 is made of a shield member including conductive metallic foil or metallic foil, and is formed in a tube shape. Further, the electromagnetic shield member 19 is formed similar in length to total length of the high-voltage electric wires 17, and is connected to the shield case of the inverter unit 4 through the connector 20.

Also, the electromagnetic shield member 19 includes metallic foil in this embodiment, but it is not limited thereto. That is, if it is possible to guard against the electromagnetic wave, braid wire having a lot of ultrafine element wires may be used. The braid wire has a conductive property and is formed in a tube shape.

The electromagnetic shield member 19 is provided because the high-voltage electric wire 17 is an unshielded electric wire as described above. If the high-voltage electric wire 17 is common shield wire, it is not limited.

The tube body 16 is a tubular member having flexibility, such as the following a corrugated tube made of resin and having a concave-convex outer peripheral surface, a tube made of resin or rubber and not having a rough outer peripheral surface, or a metallic tube having a rough outer peripheral surface. Furthermore, the cross-section of the tube body 16 is not limited to a circular shape. The cross-section of the tube body 16 may be an oval or box shape. In this embodiment, the tube body 16 which is formed in an oval shape and made of resin is used.

In the tube body 16, the oval shaped corrugated tube made of resin is effective structure so as to reduce the weight. Furthermore, the height of the corrugated tube can be reduced, that is, a distance from the ground can be increased. Thus, the above corrugated tube is used. The corrugated tube has not a slit, and preferably an outer peripheral surface of the corrugated tube is formed with watertight construction.

A plurality of light or water fixing members 21 are provided on the outer peripheral surface of the tube body 16. The light or water hardening fixing members 21 are arranged on a plurality of predefined portions of the tube body 16, respectively. The light or water hardening fixing members 21 are arranged on a predefined portion indicated by an arrows A and B shown in FIG. 1A respectively. That is, since the tube body 16 has flexibility, the light or water hardening fixing members 21 is arranged on a flexion portion of the wiring harness 9, an assembly fixing portion and the like, for example, a portion requiring retention of shape.

When the light or water hardening fixing member 21 is hardened, a shape holding portion 22 can be formed in the tube body 16. More specifically, the light or water hardening fixing member 21 includes a hardened portion hardened with light or water and base material integrating the hardened portion.

In the case of the light hardening fixing member 21, the light hardening fixing member 21 includes a hardened portion having a light illumination surface, and base material. The light hardening fixing member 21 is hardened by a visible light 23 or special illumination. The hardened portion is made of resin composition of light hardening, and is held by being impregnated with base material. Preferably, the light hardening fixing member 21 can adjust hardening time such as immediately hardened or slowly hardened. The light hardening fixing member 21 is effective in a case working environment disliking fluid. (Also, fluid is no problem with usage environment).

On the other hand, in the case of the water hardening fixing member, the water hardening fixing member includes a hardened portion having a water-absorbing surface and base material. The water hardening fixing member is hardened by splash/drop of fluid 24 or immersion treatment. The above hardened portion is made of resin composition of water hardening, and is held by being impregnated with base material. The base material is glass wool, glass cloth, polyester cloth, or nonwoven fabric cloth and others. (In the same manner, base material of the light hardening fixing member 21 is similar to the base material of the water hardening fixing member. Further, in glass cloth and polyester cloth, knitted fabric is suitable for impregnation, and it is possible to uniformly and evenly be impregnated). Furthermore, the hardened portion may be polyurethane resin of water hardening. Preferably, the water hardening fixing member adjusts hardening time in the same manner as the light hardening fixing member.

The light or water hardening fixing member 21 described above is wound around the outer peripheral surface of the tube body 16. Namely, when the light or water hardening fixing member 21 is formed in a tape shape, as shown in FIG. 2A, the light or water hardening fixing member 21 is wound with a method of tape winding. Further, when the light or water hardening fixing member 21 is formed in a sheet shape, as shown in FIG. 2B, it is wound with the sheet shape.

The light or water hardening fixing member 21 is preciously formed with a desired thickness, and is wound with a desired thickness. Therefore, strength after forming the shape holding portion 22 can be maintained. Additionally, a shape holding state can be maintained by keeping the strength. Further, the shape holding portion 21 can be prevented from damage such as a splash of stone by maintaining the strength.

When the light or water hardening fixing member 21 is wound by the method of the tape winding, as shown in FIG. 2C, a clamp 25 for assembling and fixing may be integrated in the light or water hardening fixing member 21. (The shape of the clamp 25 is one example. Thus, it is not limited, for example, a bracket may be integrated).

A supply device 26 supplies the light or water hardening fixing member 21 with the visible light 23, illumination or fluid 24 (see FIG. 1B) so as to form the shape holding portion 22 by hardening the light or water hardening fixing member 21. The supply device 26 is located in a manufacturing floor in accordance with formation area of the shape holding portion 22.

In the manufacturing floor, when the shape holding portion 22 is hardened with a desired shape, workability is improved by using a jig or die. In FIG. 1B, a state which the shape holding portion 22 is bent is shown, but it is not limited. For example, the shape holding portion 22 may be twisted and the shape thereof may be held. Furthermore, the shape holding portion 22 may be bent into an S-shape or crank shape.

When the light or water hardening fixing member 21 is hardened, the light or water hardening fixing member 21 enters into a dent portion of the outer peripheral surface of the tube body 16 and is caught in a projection portion of the outer peripheral surface of the tube body 16. As a result, formation and arrangement of the shape holding portion 22 become stable.

If the light or water hardening fixing member 21 adheres to a member made of olefin series resin being low in adhesion, the dent portion and the projection portion are effective in preventing gap.

Figure 3A:
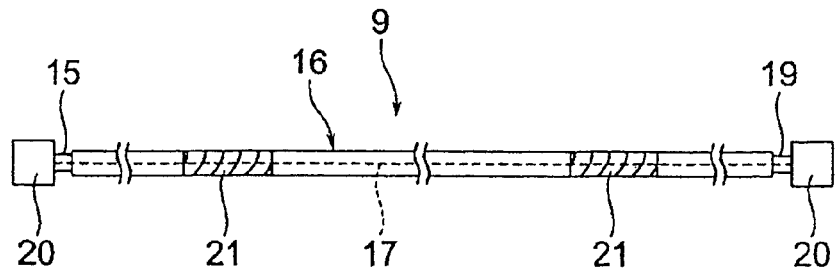
FIG. 3A to 3D are views of a manufacturing method of the wiring harness of the present invention.

As shown in FIG. 3A, the tube body 16 and the conducting path assembly 15, in which each total lengths is formed with a desired length respectively, are provided. The conducting path assembly 15 is inserted into the tube body 16, and the connector 20 is arranged in the terminal of the high-voltage electric wire 17 of the conducting path assembly. Further, the light or water hardening fixing member 21 is wound around a predefined position of the outer peripheral surface of the tube body 16. Thus, manufacture of the wiring harness 9 before transporting is completed. Also, the light or water hardening fixing member 21 is previously provided against the tube body 16, and then the conducting path assembly 15 may be inserted.

Figure 3B:
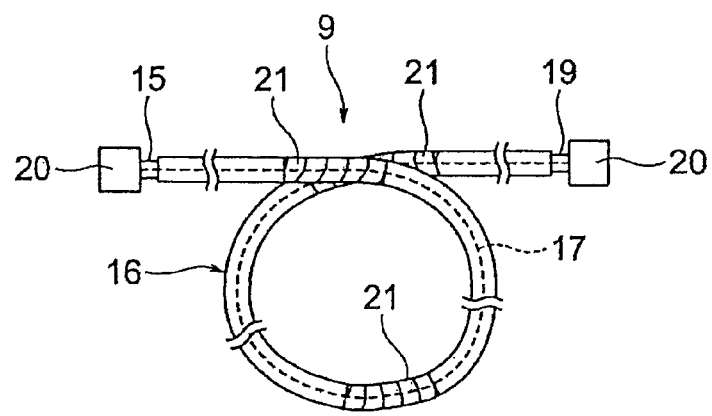

As shown in FIG. 3B, the manufactured wiring harness 9 is rounded so as to easy carry. For example, the rounded wiring harness 9 is received in a box not shown, and is carried to an assembly factory of vehicle manufacturer.

Figure 3C:
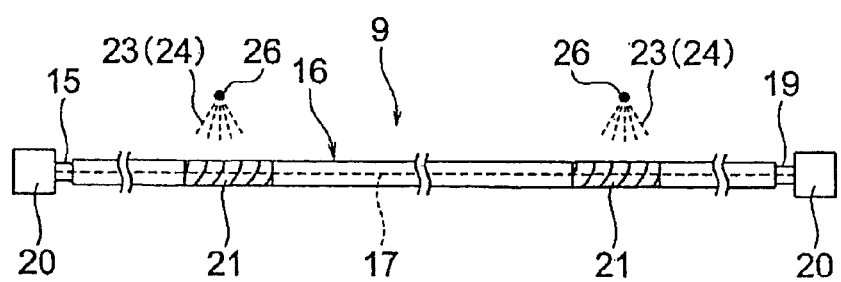

As shown in FIG. 3C, after the wiring harness 9 is carried to the assembly factory, the wiring harness 9 is taken out from the box and put into a manageable state in the manufacturing floor. And then, the visible light 23, illumination or the fluid 24 is supplied from the supply device 26 toward the light or water hardening fixing member 21 provided with a desired shape.

Figure 3D:
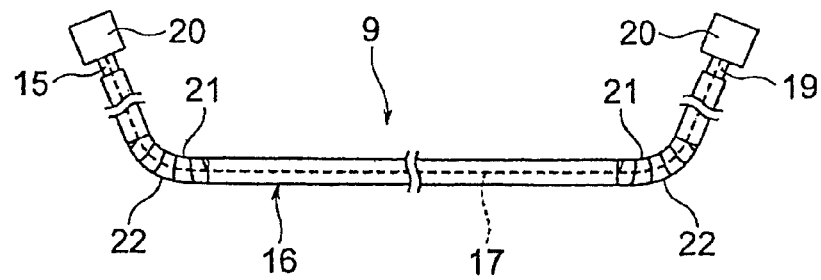

As shown in FIG. 3D, after the light or water hardening fixing member 21 is hardened and the shape holding portion 22 is formed, manufacture of the wiring harness 9 is completed. The wiring harness 9 is assembled and fix to the vehicle under floor 11 (See FIG. 1A) or is electrically connected. Thus, arrangement of the wiring harness 9 is completed.

In conclusion, as is understood from the above explanation with reference to drawings, the wiring harness 9 of the present invention can maintain the tube body 16 with a desired shape without using a conventional proctor against the flexible tube body 16 by providing the light or water hardening fixing member 21, and hardening the light or water hardening fixing member, and forming the shape holding portion 22. Further, since the wiring harness 9 has a flexible tube body 16, it is not required to keep large space when the wiring harness 9 is carried. Therefore, when carrying it, space can be saved, and cost can be reduced.

It should be noted that the embodiment has only been illustrated as a typical one of the present invention, and the present invention is in no way limited to the illustrated embodiment. Hence, the present invention can be effectuated with various modifications made thereto within the scope of the present invention.

The wiring harness 9 which does not have a branch portion is explained above, however, it is possible to separate the tube body 16 and guide the branch portion from the separated portion. Further, when guiding it, the light or water hardening portion 21 may be provided and hardened so as to cover an exposure portion of the branch portion and a terminal of the tube body 16.

REFERENCE SIGNS 1 hybrid vehicle
2 engine
3 motor unit
4 invert unit
5 battery
6 engine room
7 vehicle rear portion
8 high-voltage wiring harness
9 wiring harness
10 middle portion
11 vehicle under floor
12 junction block
13 rear end
14 front end
15 conducting path assembly
16 tube body
17 high-voltage electric wire (conducting path)
18 low-voltage electric wire (conducting path)
19 electromagnetic shield member
20 connector
21 light hardening fixing member
22 shape holding portion
23 visible light
24 fluid
25 clamp
26 supply device

What is claimed is:
1. A wiring harness comprising:
a flexible tube body being an exterior component of one or a plurality of conducting paths; and
a water hardening fixing member including a hardened portion hardened with water and a base material integrating the hardened portion or a light hardening fixing member including a hardened portion hardened with light and a base material integrating the hardened portion provided on one or a plurality of predefined positions of the tube body, wherein a shape holding portion of the tube body is formed by hardening the water or light hardening fixing member.

2. The wiring harness as claimed in claim 1, wherein an outer peripheral surface of the tube body is a rough member.

3. The wiring harness as claimed in claim 2, wherein the outer peripheral surface of the tube body is a watertight member.

4. The wiring harness as claimed in claim 3, wherein the water or light hardening fixing member is a winding type member.

5. The wiring harness as claimed in claim 2, wherein the water or light hardening fixing member is a winding type member.

6. The wiring harness as claimed in claim 1, wherein the outer peripheral surface of the tube body is a watertight member.

7. The wiring harness as claimed in claim 6, wherein the water or light hardening fixing member is a winding type member.

8. The wiring harness as claimed in claim 1, wherein the water or light hardening fixing member is a winding type member.

9. A manufacturing method of a wiring harness having a flexible tube body which is an exterior component of one or a plurality of conducting paths comprising the steps of:

a first step that providing a water hardening fixing member including a hardened portion hardened with water and a base material integrating the hardened portion or a light hardening fixing member including a hardened portion hardened with light and a base material integrating the hardened portion on one or a plurality of predefined portions of the tube body, and a second step that hardening the water or light hardening fixing member so as to form at least the predefined portions with a desired shape.

10. The manufacturing method of the wiring harness as claimed in claim 9, wherein winding type member is used as the water or light hardening fixing member, and wherein a member which is previously formed with a desired thickness or a member which is able to be formed with a desired thickness by winding is used.

11. The manufacturing method of the wiring harness as claimed in claim 9, wherein the second step is performed when the wiring harness is arranged after carrying the wiring harness.

12. The manufacturing method of the wiring harness as claimed in claim 10, wherein the second step is performed when the wiring harness is arranged after carrying the wiring harness.

* * * * *